(12) United States Patent
Gonzalez-Carlo

(10) Patent No.: US 7,928,595 B1
(45) Date of Patent: Apr. 19, 2011

(54) ELECTRIC POWER GENERATION SYSTEM FOR HARVESTING UNDERWATER CURRENTS

(76) Inventor: Julio Gonzalez-Carlo, Miami, FL (US)

( * ) Notice: Subject to any disclaimer, the term of this patent is extended or adjusted under 35 U.S.C. 154(b) by 360 days.

(21) Appl. No.: 12/207,174

(22) Filed: Sep. 9, 2008

Related U.S. Application Data

(60) Provisional application No. 60/973,705, filed on Sep. 19, 2007.

(51) Int. Cl.
*F03B 13/00* (2006.01)

(52) U.S. Cl. ............. 290/54; 290/42; 60/398; 415/3.1

(58) Field of Classification Search .............. 290/42–43, 290/53–54; 415/3.1; 60/495–496, 501, 698, 60/641.7, 398; 405/75–76, 195; 416/85; 417/330–331, 333; 119/208, 221, 238, 246; 47/59 R
See application file for complete search history.

(56) References Cited

U.S. PATENT DOCUMENTS

| | | | |
|---|---|---|---|
| 4,026,587 A | | 5/1977 | Hultman et al. |
| 4,034,231 A | * | 7/1977 | Conn et al. ........................ 290/53 |
| 4,256,970 A | * | 3/1981 | Tomassini ........................ 290/53 |
| 4,335,319 A | * | 6/1982 | Mettersheimer, Jr. .......... 290/54 |
| 4,686,376 A | | 8/1987 | Retz |
| 5,009,568 A | * | 4/1991 | Bell ................................. 415/3.1 |
| 5,440,176 A | | 8/1995 | Haining |
| 6,006,518 A | | 12/1999 | Geary |
| 6,104,097 A | | 8/2000 | Lehoczky |
| 6,652,221 B1 | * | 11/2003 | Praenkel ......................... 415/3.1 |
| 6,856,036 B2 | | 2/2005 | Belinsky |
| 6,982,498 B2 | * | 1/2006 | Tharp ............................. 290/54 |
| 6,995,479 B2 | | 2/2006 | Tharp |
| 7,036,449 B2 | * | 5/2006 | Sutter ............................. 114/264 |
| 7,042,114 B2 | | 5/2006 | Tharp |
| 7,105,942 B2 | | 9/2006 | Henricksen |
| 7,114,882 B1 | * | 10/2006 | Friedmann ..................... 405/194 |
| 7,190,087 B2 | | 3/2007 | Williams |
| 7,215,036 B1 | | 5/2007 | Gehring |
| 7,239,037 B2 | * | 7/2007 | Alstot et al. .................... 290/54 |
| 7,279,803 B1 | | 10/2007 | Bosley |
| 7,352,078 B2 | * | 4/2008 | Gehring .......................... 290/54 |

(Continued)

FOREIGN PATENT DOCUMENTS

WO      WO8101539      *   6/1981

OTHER PUBLICATIONS

Barbara Barrett, Latest U.S. Energy plan: Use power of oceans, MiamiHerald.com, posted Nov. 6, 2007, 3 pages.

(Continued)

*Primary Examiner* — Michael C Zarroli
(74) *Attorney, Agent, or Firm* — Neustel Law Offices

(57) ABSTRACT

An electric power generation system that includes a platform positioned above a water surface, an anchoring system to secure the platform to a floor below a body of water, at least one turbine extending below the platform to harvest underwater ocean currents and at least one electrical generator positioned upon the platform for outputting electrical energy. The turbine includes a rotatable shaft and a plurality of rotatable blades connected to the rotatable shaft. A first rotational axis of the rotatable shaft is vertically oriented and wherein a second rotational axis of the plurality of rotatable blades is horizontally aligned with an underwater current stream. The electrical generator is mechanically connected to the shaft of the turbine to convert a rotational torque of the shaft to electrical energy.

16 Claims, 3 Drawing Sheets

U.S. PATENT DOCUMENTS

| | | | |
|---|---|---|---|
| 7,661,922 B2* | 2/2010 | Belinsky | 415/4.3 |
| 7,768,145 B2* | 8/2010 | Susman et al. | 290/54 |
| 2005/0001432 A1 | 1/2005 | Drentham Susman et al. | |
| 2005/0285407 A1 | 12/2005 | Davis et al. | |
| 2006/0008351 A1 | 1/2006 | Belinsky | |
| 2007/0085345 A1 | 4/2007 | Brown et al. | |
| 2007/0207028 A1* | 9/2007 | Nicholas et al. | 415/3.1 |

OTHER PUBLICATIONS

Cammy Clark, Keys man's dream: Harnessing the tides, MiamiHerald.com, posted Nov. 12, 2007, 3 pages.

Cammy Clark, Keys resident hopes to tap ocean's power, MiamiHerald.com, posted Nov. 13, 2007, 3 pages.

* cited by examiner

ELECTRIC POWER GENERATION SYSTEM FOR HARVESTING UNDERWATER CURRENTS

CROSS REFERENCE TO RELATED APPLICATIONS

I hereby claim benefit under Title 35, United States Code, Section 119(e) of U.S. provisional patent application Ser. No. 60/973,705 filed Sep. 19, 2007. The 60/973,705 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to renewable energy sources and more specifically it relates to an electric power generation system for efficiently harvesting underwater ocean current energy.

2. Description of the Related Art

Any discussion of the related art throughout the specification should in no way be considered as an admission that such related art is widely known or forms part of common general knowledge in the field.

The need and desire fore renewable energy sources has become increasingly abundant with various well-known and publicized facts, such as climate change, global pollution and our nation's dependence upon foreign oil. Some renewable energy sources that are known to produce electric power include wind, tidal streams, hydroelectric, geothermal and solar. Hydroelectric power sources, such as from the Gulf Stream currents are generally constant sources and if effectively utilized and harnessed would produce an efficient means of producing electrical power.

Various hydroelectric systems are known that describe and show methods of producing electrical power from ocean currents. However, none of the prior hydroelectric systems are currently built in such a manner as to render the system substantially impervious to natural disasters, such as hurricanes, and also offer an aesthetically pleasing structure above the water surface. Because of the inherent problems with the related art, there is a need for a new and improved electric power generation system for efficiently harvesting underwater ocean current energy.

BRIEF SUMMARY OF THE INVENTION

The general purpose of the present invention is to provide an electric power generation system that has many of the advantages of the renewable energy sources mentioned heretofore. The invention generally relates to a renewable energy source which includes a platform positioned above a water surface, an anchoring system to secure the platform to a floor below a body of water, at least one turbine extending below the platform and at least one electrical generator positioned upon the platform. The turbine includes a rotatable shaft and a plurality of rotatable blades connected to the rotatable shaft. A first rotational axis of the rotatable shaft is vertically oriented and wherein a second rotational axis of the plurality of rotatable blades is horizontally aligned with an underwater current stream. The electrical generator is mechanically connected to the shaft of the turbine to convert a rotational torque of the shaft to electrical energy.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an electric power generation system for efficiently harvesting underwater ocean current energy.

Another object is to provide an electric power generation system that offers an aesthetically pleasing structure above the water surface.

An additional object is to provide an electric power generation system that may include various types of foliage to mimic an island.

A further object is to provide an electric power generation system that may include a lighthouse for aesthetic reasons and also to help guide shipping lanes and traffic.

Another object is to provide an electric power generation system that will be able to withstand various natural disasters (e.g. hurricanes) that are common in places where ocean currents are prevalent.

Another object is to provide an electric power generation system that is securely mounted to the ocean floor.

Another object is to provide an electric power generation system that may be comprised of various sizes to house a large or small number of electrical generators.

Another object is to provide an electric power generation system that will be substantially eco-friendly.

Another object is to provide an electric power generation system that will reduce our nation's dependence upon foreign oil.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
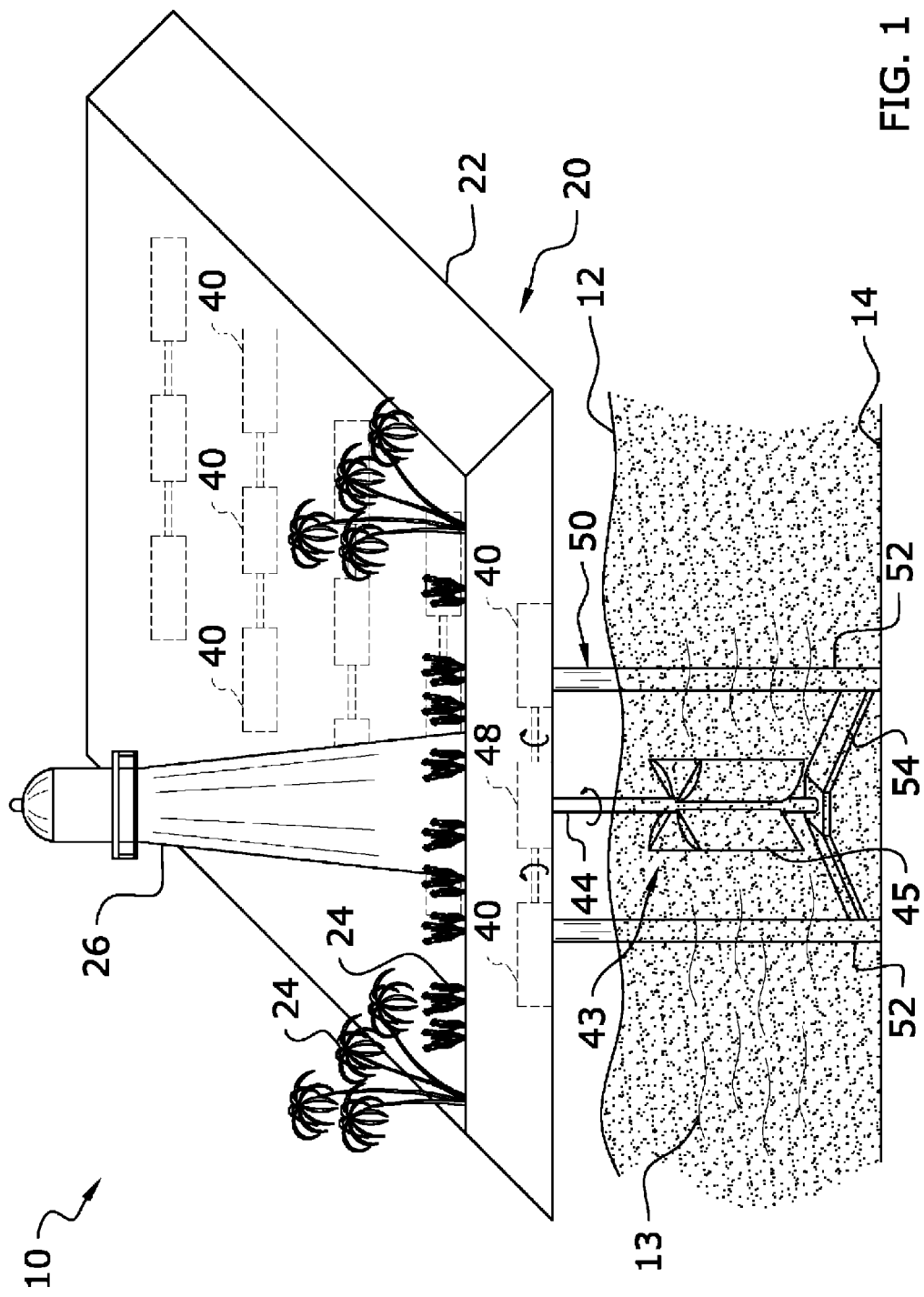
FIG. 1 is a side illustration of the present invention in a first embodiment.
Figure 2:
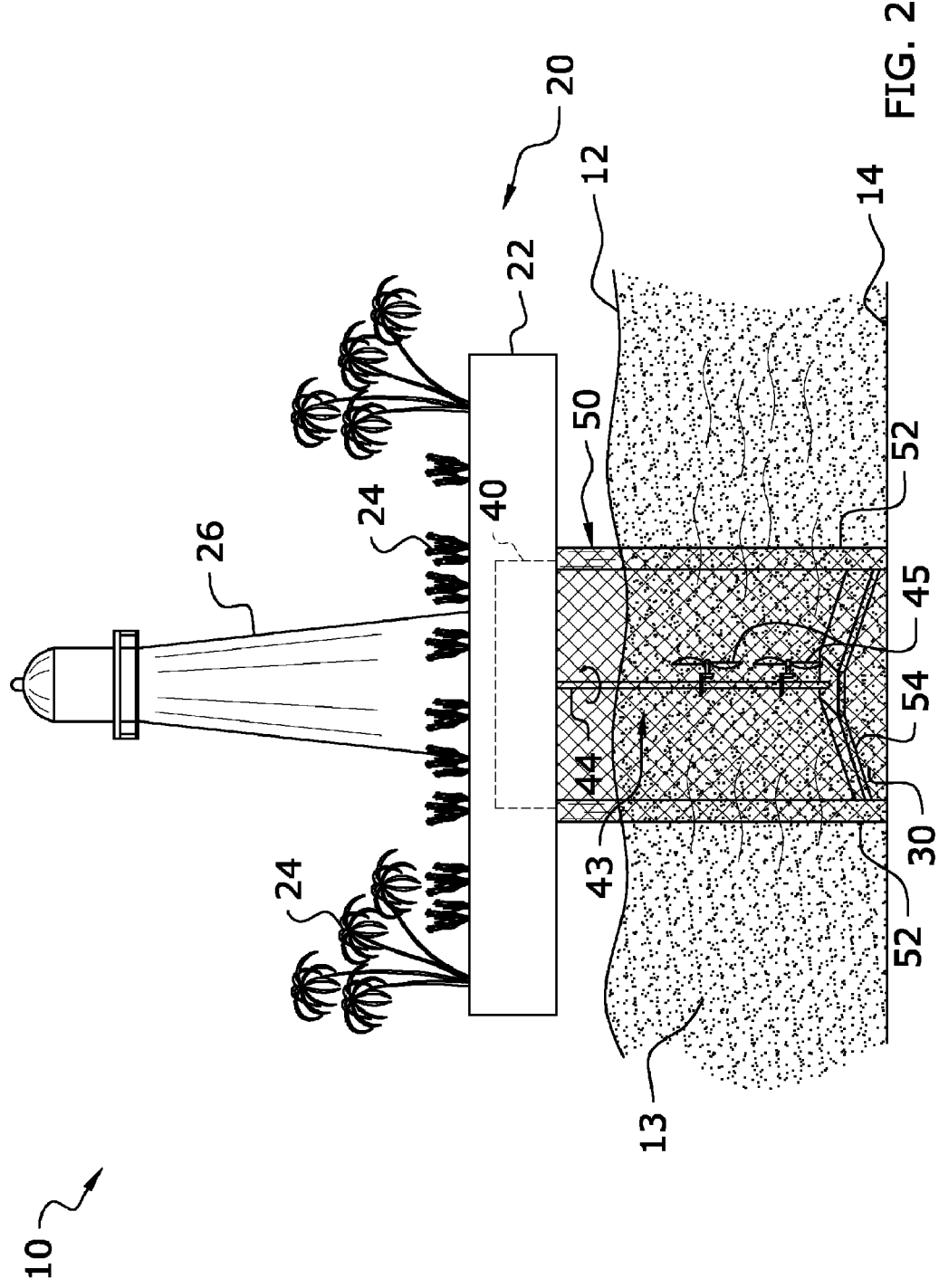
FIG. 2 is a side illustration of the present invention in a second embodiment.
Figure 3:
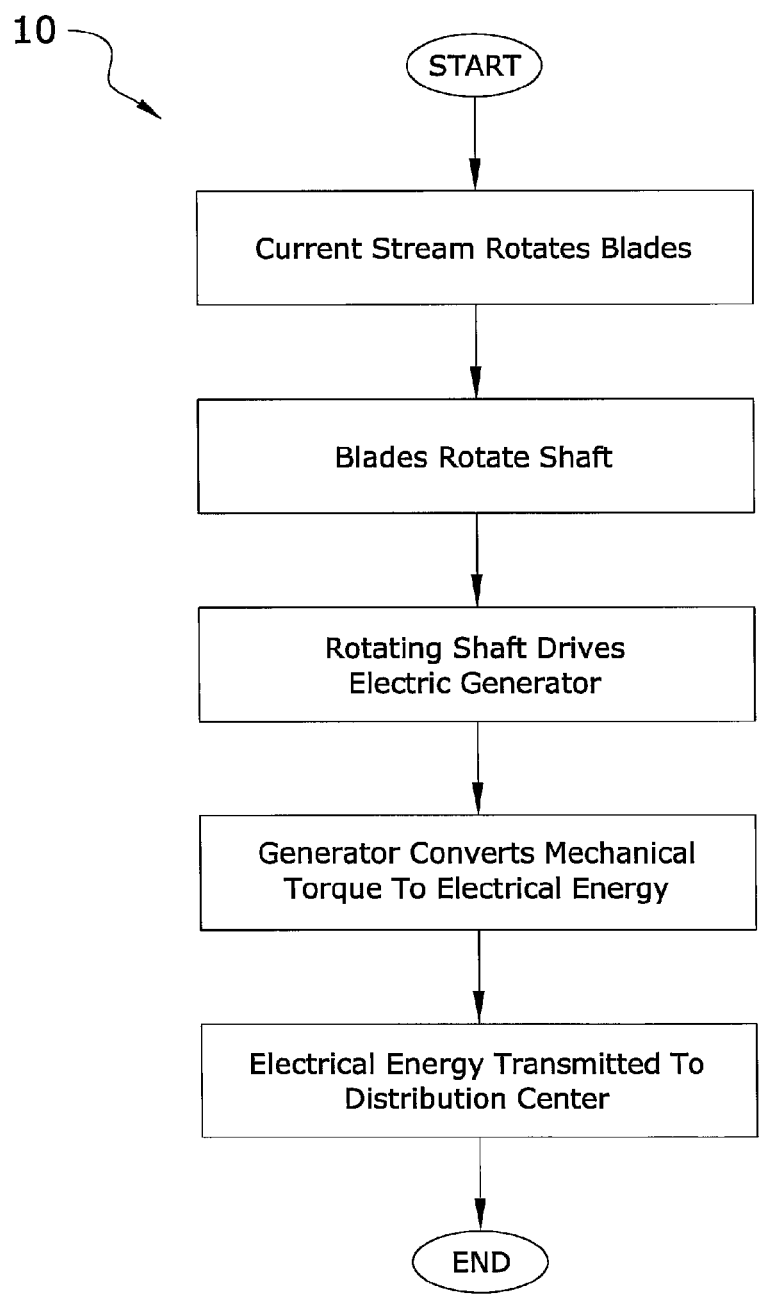
FIG. 3 is a flowchart illustrating a preferred process of the present invention.

Turning now descriptively to the drawings, in which similar reference characters denote similar elements throughout the several views, FIGS. 1 through 3 illustrate an electric power generation system 10, which comprises a platform 20 positioned above a water surface 12, an anchoring system 50 to secure the platform 20 to a floor 14 below a body of water 11, at least one turbine 43 extending below the platform 20 and at least one electrical generator 40 positioned upon the platform 20. The turbine 43 includes a rotatable shaft 44 and a plurality of rotatable blades 45 connected to the rotatable shaft 44. A first rotational axis of the rotatable shaft 44 is vertically oriented and wherein a second rotational axis of the plurality of rotatable blades 45 is horizontally aligned with an underwater current stream 13. The electrical generator 40 is mechanically connected to the shaft 44 of the turbine 43 to convert a rotational torque of the shaft 44 to electrical energy.

B. Platform

The present invention preferably includes a platform 20 in which the electrical generators 40 and all other electrical or mechanical equipment that is needed or desired to be used with the generators 40 is positioned upon. In the preferred embodiment, the platform 20 rests above the water surface 12 at a height great enough to prevent the platform 20 from being encompassed by waves from the body of water 11. The platform 20 may be comprised of concrete, metal or various other strong and durable materials. The platform 20 may be comprised of various sizes, such as 300×150 feet or various other sizes much larger or smaller. When using multiple platforms 20, the platforms are each preferably situated at least a distance of 50 to 100 miles apart from one another.

The platform 20 is generally comprised of a flat surface; however it is appreciated that the platform 20 may include various types of terrain to mimic the appearance of an island or other aesthetically pleasing structure. The platform 20 may also include an enclosure 22 extending over a portion or the entire upper surface of the platform 20 to enclose the electrical generators 40 and other necessary equipment. The enclosure 22 may be comprised of various shapes and contours to provide an aesthetically pleasing configuration.

The enclosure 22 is generally configured at a slanted angle in order to deflect strong winds to avoid damage to the platform 20 and the generators 50 inside. The enclosure 22 walls may be angled in various manners, such as but not limited to 45 or 60 degrees.

C. Foliage

A mass amount of foliage 24 is also preferably present upon the platform 20. The foliage 24 may be comprised of grasses, flowers, trees (e.g. Palm), waterfalls or various other types of natural foliage 24. The foliage 24 is meant to have the platform 20 and visible portion of the present invention from above the water surface 12 mimic an island or other aesthetically pleasing structure for individuals looking at the present invention from sea crafts or upon the mainland. The foliage 24 may be comprised of artificial or real (i.e. growing) foliage 24. The foliage 24 may also encompass the entire platform 20 and/or enclosure 22 or only a portion of the platform 20 and/or enclosure 22.

Again, the foliage 24 is meant to mimic foliage 24 present upon a tropical island. The tropical island may be described as a land mass surrounded by a body of water including a plurality of trees, shrubs, other vegetation and may also include sand beaches and other naturally occurring foliage 24 or substances common to a tropical island.

D. Lighthouse

A lighthouse 26 may also extend from the platform 20 or adjacent the platform 20. The lighthouse 26 provides many benefits, such as assisting in guiding traffic lanes through the body of water 11, providing navigation point for ships and also increasing the aesthetic structure of the present invention.

E. Electrical Generators

The electrical generators 40 are generally positioned upon the platform 20 above the water surface 12. It is appreciated however that the electrical generators 40 may be positioned below the water surface 12. The present invention may include various numbers (e.g. 40, 50, etc.) of electrical generators 40 all which may be supported and desired to be utilized with the present invention. The number of generators 40 will generally be determined by the size of the platform 20 and the source of power from the underwater turbines 43.

The torque from the shaft 44 of the turbines 43 will preferably be used to drive the generators 40 on the platform 20 to generate the electrical power. In one embodiment, the shaft 44 is directly connected to the generator 40 to directly drive the generator 40. The generators 40 may also be positioned along the wall of the enclosure 22 in that the platform 20 may not be large enough to accommodate all the generators 40.

In another embodiment, the shaft 44 of the turbine 43 may be mechanically connected to a transfer mechanism 48. The transfer mechanism 48 is comprised of a device to transfer mechanical power from the shaft 44 to the electrical generators 40. The transfer mechanism 48 receives the rotational torque from the vertical shaft 44 and transfers that rotational torque to the electrical generators 40 (in a horizontal or vertical manner). The rotational torque may be transferred between the transfer mechanism 48 and the generators 40 via various types of rotational connectors. Since the current from the ocean current stream 13 is often constant, a uniform amount of power may be generated by the electrical generators 40 from the turbines 43.

Positioning the electrical generators 40 upon the platform 20 and above the water surface 12 makes for an easier and low cost method of production of the present invention. The generators 40 will be easier to install, easier to provide maintenance upon and the overall operation of the generators 40 will be more effective and economical.

The electrical generators 40 are comprised of a type that may work to convert the mechanical energy received from the turbines 43 and convert that mechanical energy to electrical energy. Various types of connectors, cables and other electrical and mechanical equipment common in the art may be utilized with the present invention to efficiently convert the mechanical energy from the turbines 43 to electrical energy by the generators 40 and transfer the converted electrical energy to shore (e.g. through cables, etc.) or another location in which the electrical energy may be distributed and utilized.

G. Turbines

The present invention may also include any number of turbines 43 extending vertically downward from the platform 20 within the body of water 11 and toward the ocean current stream 13, wherein the turbines 43 are positioned to capture the kinetic energy from the ocean current streams 13. The turbines 43 generally include a shaft 44 extending vertically downward from the platform 20 to a location that intersects the ocean current streams 13 that are to be utilized to capture energy. Rotatably extending from the shaft 44 is a plurality of blades 45 that rotate from engaging the ocean current stream 13. As the blades 45 are rotated via the current stream 13, the blades 45 transfer the rotational torque to the shaft 44 which in turn transfers the rotational torque to the generators 40 to drive the generators 40. The rotational direction of the shaft 44 is thus generally perpendicular to the rotational direction of the blades 45. A first rotational axis of the rotatable shaft 44 is vertically oriented and a second rotational axis of the plurality of rotatable blades 45 is horizontally aligned.

It is appreciated that multiple sets of blades 45 may be rotatably connected upon a single shaft 44. The multiple sets of blades 45 may be vertically offset or horizontally offset from one another with respect to the shaft 44. The blades 45 also preferably include a substantially large surface area as shown in FIG. 1 so as to be more cost effective and better grasp the underwater currents 13. The blades 45 extends along a major portion of the length of the shaft 44. The large surface area of the blades 45 resembles a paddle-wheel in the preferred embodiment.

In one embodiment, the rotating torque of the blades 45 is transferred to the electrical generators 40 to produce the electrical energy via the blades 45 causing the shaft 44 to rotate, wherein the shaft 44 is directly connected to the generator 40 rotor of the generator 40. In another embodiment, as stated previously, the shaft 44 may be directly connected to a transfer mechanism 48 that distributes the rotational torque outwards to a plurality of generators 40 surrounding the transfer mechanism 48. In other embodiments, the rotational torque of the blades 45 may be transferred to the generator 40 via various other mechanical components, such as connectors or cables.

The turbines 43 may also be comprised of standard wind power generators 40 that are commonly used on land to capture wind, only inverted to extend from the platform 20 to capture ocean currents from the current stream 13. It is also appreciated that in an alternate embodiment, the turbines 43 may horizontally extend directly within the ocean current stream 13. It is also appreciated that a screen 30 surrounds the turbines 43 underwater to prevent the turbines 43 from coming into contact with aquatic life (e.g. fish, sharks, etc.).

H. Anchoring System

The present invention includes an anchoring system 50 to securely mount the platform 20 to the ocean floor 14. The anchoring system 50 prevents the platform 20 from floating or being tossed during contact with extreme waves, such as during a hurricane. One location in which the present invention is desired to be utilized is the Gulf Stream off of Florida which experiences many hurricanes. For this reason, it is important for the platform 20 to be securely mounted to the ocean floor 14.

The anchoring system 50 may be comprised of various configurations all which stabilize the platform 20 and is strong enough to withstand impact from various types of natural disasters (e.g. hurricanes). In the preferred embodiment, the anchoring system 50 is comprised of a plurality of support legs 52 extending vertically downward from the platform 20 and within the ocean floor 14 to a proper depth in which the support legs 52 are stabilized. The support legs 52 may be comprised of various strong and durable materials, such as but not limited to concrete or metal. At least one cross support 54 also preferably, connects the anchoring system 50 to the shaft 45 of the turbines 43 to stabilize the turbines 43 within the body of water 11.

I. Operation of Preferred Embodiment

In use, the turbines 43, electrical generators 40, and other electrical and mechanical equipment function to generate electrical energy from the ocean currents (e.g. within the Gulf Stream, etc.). In one embodiment, the ocean currents from the current stream 13 rotate the blades 45, which in turn rotate the shaft 44 which subsequently dives the electrical generator 40. The electrical energy generated by the generator 40 is transferred to a distribution center to be utilized by the public.

The foliage 24 and lighthouse 26 upon the platform 20 create an aesthetically pleasing structure so as to hide many of the generators 40 and other components that are not deemed aesthetically pleasing. It is appreciated that the present invention may be positioned within various types of bodies of water 11, such as but not limited to oceans, gulfs, lakes, seas, rivers, bays, channels or any body of water with underwater current streams 13.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An electric power generation system, comprising: a platform positioned above a water surface; a mass amount of foliage upon said platform; an anchoring system to secure said platform to a floor below a body of water; at least one turbine extending below said platform, wherein said at least one turbine is positioned within an underwater current stream; and at least one electrical generator positioned upon said platform, wherein said at least one electrical generator is connected to said at least one turbine to convert a rotational torque of said at least one turbine to electrical energy, wherein said at least one turbine includes a plurality of blades and a shaft, and wherein a first rotational axis of said shaft is vertically oriented and wherein a second rotational axis of said plurality of blades is horizontally aligned.

2. The electric power generation system of claim 1, wherein said mass amount of foliage is comprised of a plurality of trees.

3. The electric power generation system of claim 1, wherein said mass amount of foliage mimics tropical island foliage.

4. The electric power generation system of claim 1, wherein said anchoring system includes a plurality of support legs.

5. The electric power generation system of claim 1, including a lighthouse extending from said platform.

6. The electric power generation system of claim 1, wherein said at least one turbine is comprised of an inverted wind turbine configuration.

7. The electric power generation system of claim 1, wherein said plurality of blades are rotatably connected with respect to said shaft and wherein said shaft is rotatably connected with respect to said plurality of blades.

8. The electric power generation system of claim 1, wherein said shaft directly drives at least one generator via a rotational torque of said shaft.

9. The electric power generation system of claim 7, wherein a rotational direction of said plurality of blades is perpendicular to a rotational direction of said shaft.

10. The electric power generation system of claim 1, including a transfer mechanism to transfer a rotational torque of said at least one turbine to said at least one electrical generator.

11. The electric power generation system of claim 1, including an enclosure extending from said platform to encompass said at least on generator.

12. The electric power generation system of claim 11, wherein said enclosure includes a plurality of slanted walls extending upwardly.

13. The electric power generation system of claim 1, wherein said at least one turbine includes a plurality of turbines and wherein said at least one electrical generator includes a plurality of electrical generators, and including a screen surrounding said plurality of turbines.

14. An electric power generation system for harvesting underwater currents, comprising:
a platform positioned above a water surface; a mass amount of foliage upon said platform;
a lighthouse extending from said platform;
an anchoring system to secure said platform to a floor below a body of water; at least one turbine extending below said platform; wherein said at least one turbine includes a rotatable shaft and a plurality of rotatable blades connected to said rotatable shaft; wherein a first rotational axis of said rotatable shaft is vertically oriented and wherein a second rotational axis of said plurality of rotatable blades is horizontally aligned with an underwater current stream; and at least one electrical generator positioned upon said platform, wherein said at least one electrical generator is mechanically connected to said shaft of said at least one turbine to convert a rotational torque of said shaft to electrical energy,
wherein said plurality of blades includes a first set of blades and a second set of blades, wherein said first set of blades and said second set of blades are vertically offset from each other along said shaft.

15. The electric power generation system of claim 14, wherein said at least one turbine includes a plurality of turbines and wherein said at least one electrical generator includes a plurality of electrical generators, and including a screen surrounding said plurality of turbines.

16. An electric power generation system, comprising:
a platform positioned above a water surface;
an anchoring system to secure said platform to a floor below a body of water;
a plurality of turbines extending below said platform;
wherein said plurality of turbines include a rotatable shaft and a plurality of rotatable blades connected to said rotatable shaft;
wherein a first rotational axis of said rotatable shaft is vertically oriented and wherein a second rotational axis of said plurality of rotatable blades is horizontally aligned with an underwater current stream;
wherein said plurality of rotatable blades are comprised of a paddle-wheel configuration;
a screen surrounding said plurality of turbines;
a plurality of electrical generators positioned upon said platform, wherein said plurality of electrical generators are mechanically connected to said shaft of said plurality of turbines to convert a rotational torque of said shaft to electrical energy;
a mass amount of foliage upon said platform; and
a lighthouse extending from said platform.

* * * * *